United States Patent

Matsuura (10) Patent No.: US 10,776,944 B2
(45) Date of Patent: Sep. 15, 2020

(54) FACE POSITION DETECTING DEVICE

(71) Applicant: Yoshio Matsuura, Aichi (JP)

(72) Inventor: Yoshio Matsuura, Aichi (JP)

(73) Assignee: Omron Corporation, Kyoto (JP)

(*) Notice: Subject to any disclaimer, the term of this patent is extended or adjusted under 35 U.S.C. 154(b) by 85 days.

(21) Appl. No.: 16/216,612

(22) Filed: Dec. 11, 2018

(65) Prior Publication Data

US 2019/0188878 A1   Jun. 20, 2019

(30) Foreign Application Priority Data

Dec. 11, 2017 (JP) ................. 2017-236658

(51) Int. Cl.
| | |
|---|---|
| G06T 7/73 | (2017.01) |
| G06F 3/041 | (2006.01) |
| G06F 3/03 | (2006.01) |
| G06F 3/01 | (2006.01) |
| G06F 3/0354 | (2013.01) |
| G06F 3/038 | (2013.01) |
| B60Q 9/00 | (2006.01) |

(52) U.S. Cl.
CPC ............ G06T 7/73 (2017.01); G06F 3/012 (2013.01); G06F 3/0304 (2013.01); G06F 3/038 (2013.01); G06F 3/03547 (2013.01); G06F 3/041 (2013.01); B60Q 9/00 (2013.01); *G06F 2203/0381* (2013.01); *G06T 2207/30201* (2013.01); *G06T 2207/30268* (2013.01)

(58) Field of Classification Search
None
See application file for complete search history.

(56) References Cited

U.S. PATENT DOCUMENTS

2019/0147273 A1* 5/2019 Hyuga ............... B60W 40/09
340/425.5

FOREIGN PATENT DOCUMENTS

| JP | 2007-230369 A | 9/2007 |
|---|---|---|
| JP | 2012-208714 A | 10/2012 |
| JP | 2014-049023 A | 3/2014 |
| JP | 2016-110269 A | 6/2016 |

OTHER PUBLICATIONS

Office Action issued in Japanese Application No. 2017-236658, dated Mar. 24, 2020 (4 pages).

* cited by examiner

*Primary Examiner* — Dov Popovici
(74) *Attorney, Agent, or Firm* — Osha Liang LLP (57) ABSTRACT

A face position detecting device includes: an image analyzer configured to analyze an image of a face imaged by an imaging unit and to extract a positional relationship between at least two characteristic points in the face; and a face position calculator configured to calculate a position of the face. The face position calculator calculates a position of the face in a space, upon operation of an operation screen, according to positional relationships among the face imaged, the imaging unit, and an operation unit, and except upon the operation, according to the positional relationship between the at least two characteristic points that the image analyzer extracts from the face imaged and positional relationships between a plurality of positions of the face and a plurality of the at least two characteristic points corresponding to the plurality of positions of the face obtained in respective operations, respectively.

9 Claims, 7 Drawing Sheets

$$D \cdot \sin\theta_d + (D \cdot \cos\theta_d) \cdot \tan\theta_f = \Delta x$$

$$D = \frac{\Delta x}{\sin\theta_d + \cos\theta_d \cdot \tan\theta_f}$$

FACE POSITION DETECTING DEVICE

CROSS-REFERENCE TO RELATED APPLICATION

This application is based on Japanese Patent Application No. 2017-236658 filed with the Japan Patent Office on Dec. 11, 2017, the entire contents of which are incorporated herein by reference.

FIELD

The present invention relates to a device for detecting the face position of a vehicle driver or the like.

BACKGROUND

In a vehicle, there is demand for an application configured to determine where a driver is looking at and to perform predetermined control accordingly. For example, in a case where the driver is looking at a rearview mirror, a message or an image is displayed on the rearview mirror, or in a case where the driver does not watch a meter when the driver should check the meter, a warning is issued to the driver. Upon determining such a visually recognized section, it is necessary to detect the line-of-sight direction of the driver and the face position in the space (for example, the distance from a reference position).

An example of the driver's face detector is a driver monitor including a camera. The driver monitor is a device which monitors the condition of a driver according to the face image of the driver captured by the camera and performs predetermined control such as issuing an alarm in a case where the driver is dozing off or looking aside during driving. From the face image obtained by the driver monitor, information on the line-of-sight direction can be obtained; however, information on the face position in the space cannot be obtained. Therefore, it is impossible to determine where the driver is looking at only from the face image obtained by the driver monitor.

JP 2007-230369 A discloses that the face direction (angle) and the line-of-sight direction of a driver are detected from the face image of the driver, and predetermined control (loudspeaker volume control or the like) is performed on an in-vehicle device according to them. However, since it is not possible to detect the face position in the space with this method, it is impossible to determine where the driver is looking at. In addition, each of JP 2012-208714 A and JP 2014-49023 A discloses that a detected pressed location on a touch panel is corrected according to the relative positional relationship between a user's face and the touch panel. However, also according to these literatures, it is not possible to detect the face position in the space.

As a method of detecting the face position in the space, it is conceivable to provide a plurality of cameras or to provide a dedicated sensor. However, with these methods, the number of components increases, the configuration becomes complicated, and the cost is high.

SUMMARY

An object of the present invention to realize a face position detecting device capable of detecting a face position in a space without a complicated configuration.

A face position detecting device according to the present invention includes: an imaging unit configured to image a face of a user, an operation unit configured to receive a predetermined input by the user operating an operation screen; an image analyzer configured to analyze an image of the face imaged by the imaging unit and to extract a positional relationship between at least two characteristic points in the face in the image; and a face position calculator configured to calculate a position of the face imaged by the imaging unit. Upon operation of the operation screen, the face position calculator calculates a position of the face in a space according to positional relationships among the face imaged, the imaging unit, and the operation unit. Except upon the operation, the face position calculator calculates a position of the face in the space according to the positional relationship between the at least two characteristic points that the image analyzer extracts from the face imaged and positional relationships between a plurality of positions of the face and a plurality of characteristic points corresponding to the plurality of positions of the face, respectively, obtained in respective operations.

According to such a face position detecting device, upon operation of the operation unit, the positional relationship between characteristic points (for example, the space between the eyes) is extracted from a face image, and a face position in the space is calculated according to the positional relationships among the face imaged, the imaging unit, and the operation unit. When the operation unit is not operated, a face position in the space is calculated according to the positional relationship between the characteristic points extracted from a face image and positional relationships between a plurality of face positions and characteristic points obtained upon respective operations. Therefore, it is possible to detect the face position in the space with a simple configuration without providing a plurality of imaging units or providing a dedicated sensor.

In the present invention, upon operation of the operation screen, the face position calculator may geometrically calculate a position of the face in the space according to an angle of the face with respect to the imaging unit, a line-of-sight angle of the user watching the operation screen, and a distance from the imaging unit to an operation point on the operation screen.

The present invention may include an approximate expression generating unit configured to generate an approximate expression for calculating a position of the face from the positional relationship of the at least two characteristic points. The approximate expression generating unit collects statistical data obtained by associating the positional relationship of the at least two characteristic points extracted by the image analyzer upon each operation of the operation screen with a position of the face calculated by the face position calculator upon each operation of the operation screen, and generates the approximate expression according to the statistical data.

In the present invention, the approximate expression generating unit may update the approximate expression every time the operation screen is operated.

The present invention may further include a visually recognized section determination unit configured to determine a section that the user visually recognizes according to a position of the face in the space that the face position calculator calculates and a line-of-sight direction of the user that the image analyzer extracts.

In the present invention, the position of the face in the space may be a distance from the imaging unit to a predetermined part of the face.

In the present invention, the operation unit may be configured of a touch panel. This touch panel may be a touch panel of a car navigation device mounted on a vehicle.

In the present invention, the imaging unit may be a camera of a driver monitor mounted on a vehicle and configured to monitor the condition of a driver.

According to the present invention, it is possible to provide a face position detecting device capable of detecting the face position in the space with a simple configuration.

DETAILED DESCRIPTION

Hereinafter, embodiments of a face position detecting device according to the present invention will be described with reference to the drawings. Hereinafter, a device mounted on a vehicle and configured to detect the driver's face position will be described as an example.

Figure 1:
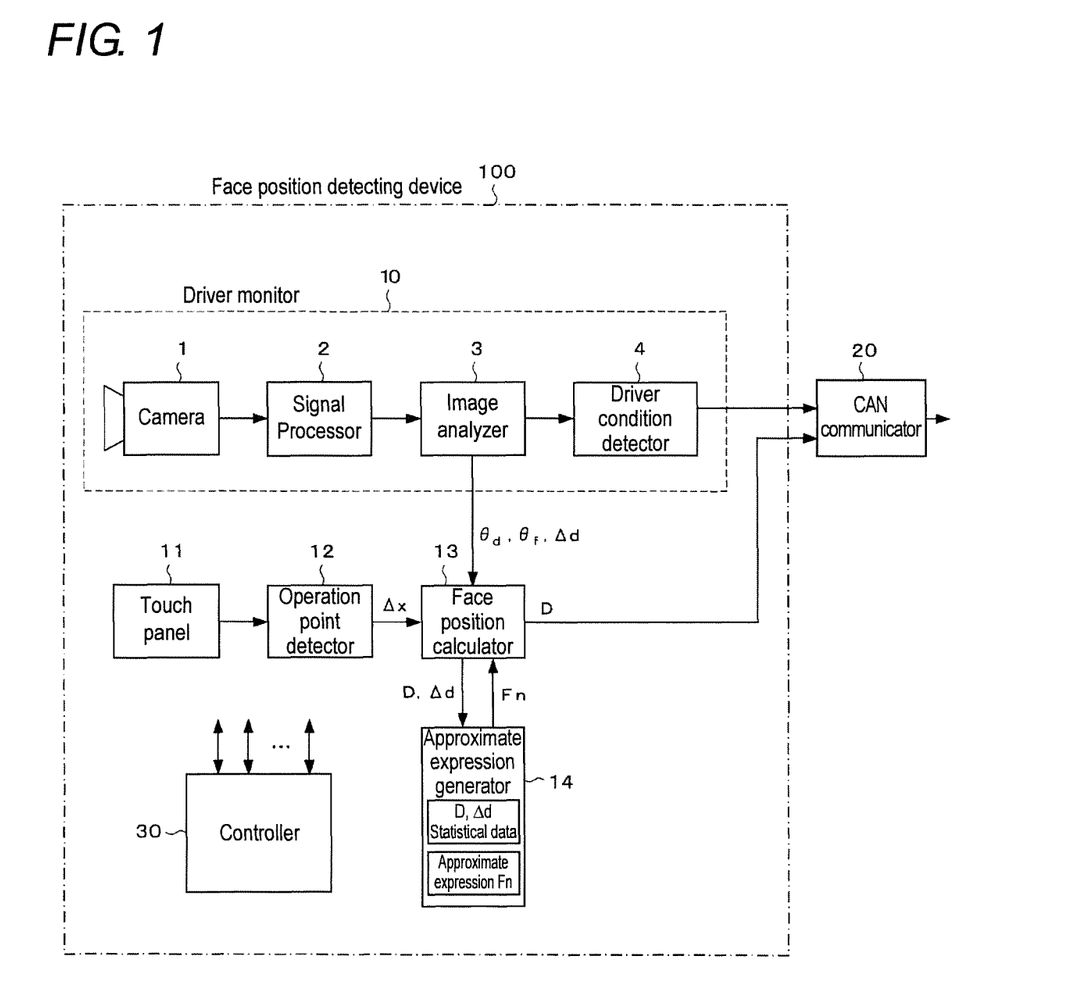
FIG. 1 is a block diagram of a face position detecting device according to an embodiment of the present invention.

First, the configuration of the face position detecting device will be described with reference to FIG. 1. In FIG. 1, a face position detecting device 100 is configured of a driver monitor 10, a touch panel 11, an operation point detector 12, a face position calculator 13, an approximate expression generating unit 14, and a controller 30. The driver monitor 10 is a device configured to monitor whether or not the driver is in a normal condition while imaging the face of the driver, and includes a camera 1, a signal processor 2, an image analyzer 3, and a driver condition detector 4.

Figure 2:
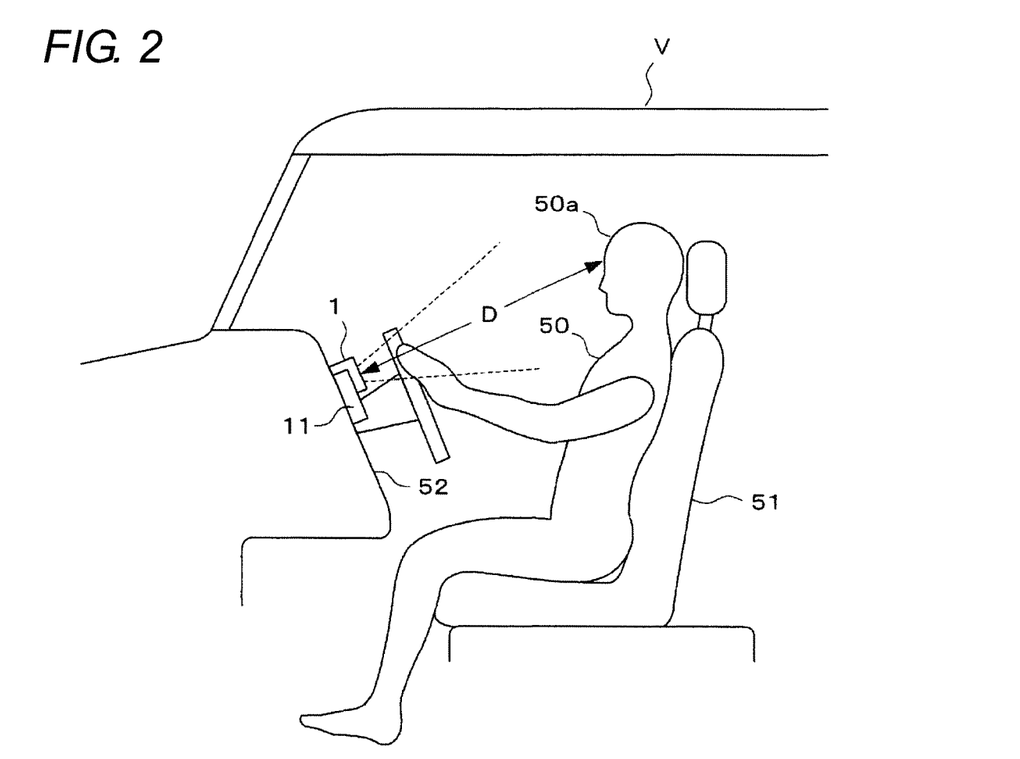
FIG. 2 is a view for explaining imaging of a driver's face.

For example, as illustrated in FIG. 2, the camera 1 is provided on a dashboard 52 of the driver's seat of a vehicle V. The installation position and the installation angle of the camera 1 are adjusted such that the camera 1 can image a face 50a of a driver 50 seated on a seat 51. Broken lines illustrate the imaging range of the camera 1. The camera 1 constitutes an "imaging unit" in the present invention, and has an imaging device such as a CMOS image sensor. The vehicle V is, for example, a four-wheeled automobile. The driver 50 is an example of a "user" in the present invention.

The signal processor 2 performs processes such as converting an image signal of the face imaged by the camera 1 into a digital signal. The image analyzer 3 analyzes a face image according to the image signal output from the signal processor 2, extracts characteristic points (for example, eyes), and detects the face angle, the line-of-sight direction, movement of eyelids, and the like. The driver condition detector 4 detects the condition of the driver 50 according to the analysis result obtained by the image analyzer 3. For example, in a case where the eyelids are closed for more than a certain period of time, the driver condition detector 4 detects the driver 50 dozing off. In a case where the line of sight is directed sideways even during driving, the driver condition detector 4 detects the driver 50 looking aside during driving. The detection result obtained by the driver condition detector 4 is sent to an electronic control unit (ECU), not illustrated, mounted on the vehicle, via a controller area network (CAN) communicator 20. The ECU performs predetermined control (output of an alarm, for example) on the vehicle according to the detection result.

Figure 3:
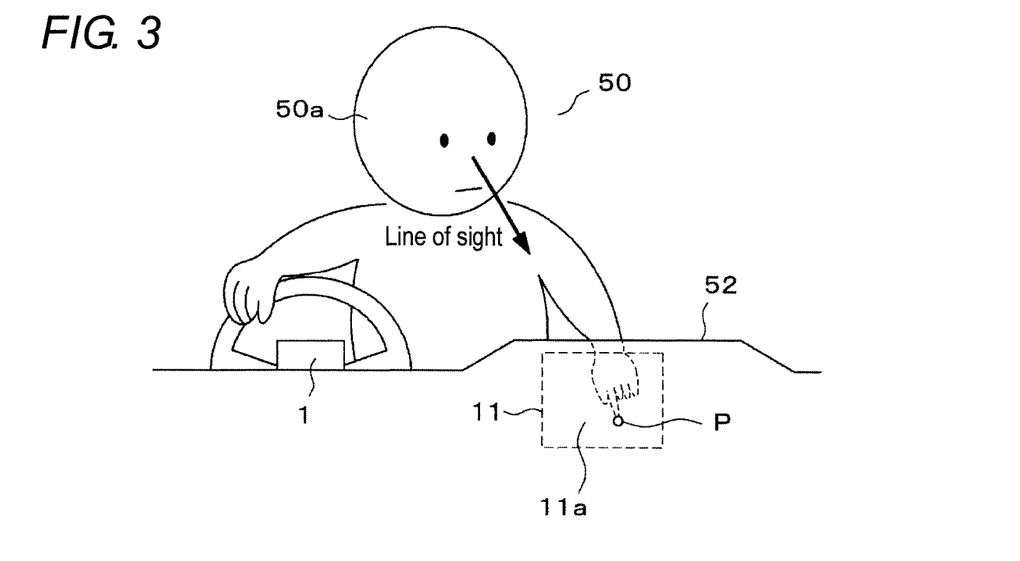
FIG. 3 is a view for explaining a line-of-sight direction of a driver.

The touch panel 11 is an example of an "operation unit" in the present invention. In the embodiment, the touch panel 11 is a touch panel of a car navigation device mounted on the vehicle. As illustrated in FIGS. 2 and 3, the touch panel 11 is provided side by side with the camera 1 on the dashboard 52 of the driver's seat of the vehicle V. As illustrated in FIG. 3, the touch panel 11 has an operation screen 11a. The touch panel 11 receives a predetermined input when the driver 50 operates the operation screen 11a.

The operation point detector 12 is a circuit that detects an operation point P (FIG. 3) on the operation screen 11a, that is, the location where a pressing operation is performed. The location of the operation point P is determined by XY coordinates of switch electrodes, not illustrated, arranged in a matrix, and the switch electrode positioned at the section where a pressing operation is performed becomes electrically conductive. Thus, the operation point P is detected.

When the operation screen 11a of the touch panel 11 is operated, the face position calculator 13 calculates the position of the face 50a imaged by the camera 1 according to a parameter Δx obtained from the detection result in the operation point detector 12 and parameters $\theta_d$, and $\theta_f$ obtained from the analysis result in the image analyzer 3. These parameters and the arithmetic expression of the face position will be described later in detail. In the embodiment, a distance D from the camera 1 to the face 50a illustrated in FIG. 2 is calculated as the face position in the space (absolute position). Since the position of the camera 1 in the space is determined in advance, if the distance D to the face 50a is known with reference to the camera position, the position of the face 50a in the space can be determined. The calculation result (distance D) in the face position calculator 13 is sent to the above-described ECU via the CAN communicator 20. In addition, the face position calculator 13 acquires a parameter Δd to be described later from the image analyzer 3. The distance D and the parameter Δd are sent to the approximate expression generating unit 14.

Figure 5:
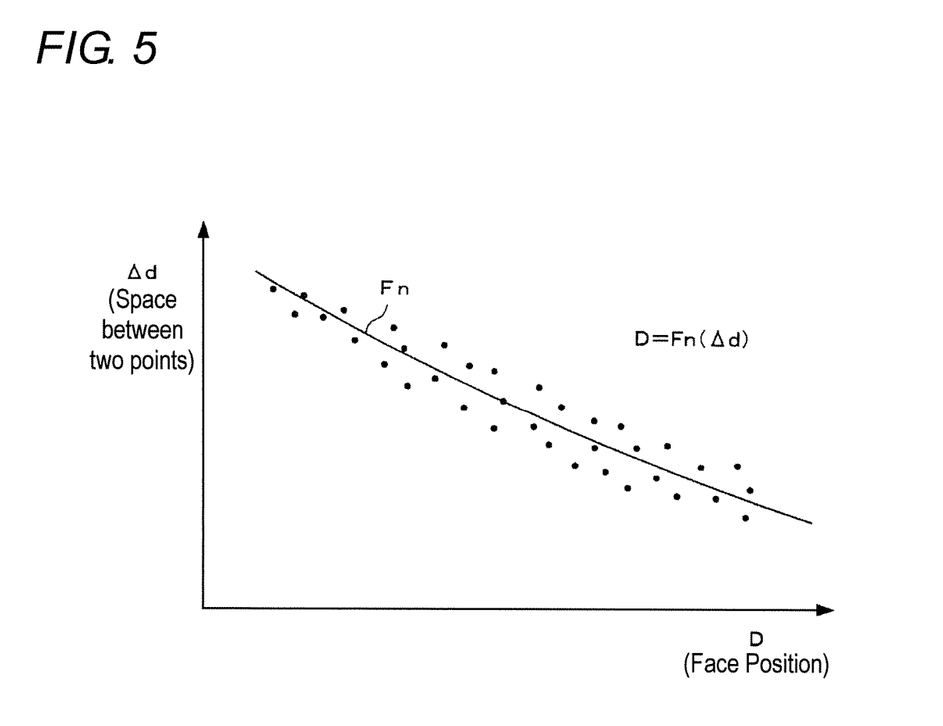
FIG. 5 is a graph illustrating an approximate expression for calculating a face position.

The approximate expression generating unit 14 collects statistical data obtained by associating the face position (distance D) and the parameter Δd (to be described later) when the operation screen 11a is operated with each other, and generates an approximate expression Fn for calculating the position of the face 50a in the space according to the statistical data. The face position calculator 13 calculates the position of the face 50a by using this approximate expression Fn when the operation screen 11a is not operated. FIG. 5 illustrates an example of the approximate expression Fn, and the details of the approximate expression Fn will be described later.

The controller 30 is configured of a microcomputer including a CPU, a memory, and the like, and integrally controls operation of the face position detecting device 100. Therefore, the controller 30 is connected to each unit of the face position detecting device 100 via a signal line (not illustrated) and communicates with each unit.

Note that the functions of the image analyzer 3, the driver condition detector 4, the face position calculator 13, and the approximate expression generating unit 14 are actually realized by software.

Next, the principle of detecting the face position in the space by using the above-described face position detecting device 100 will be described.

As FIG. 3 illustrates, in a case where the driver 50 operates the touch panel 11, the driver 50 will inevitably see the operation screen 11a. Therefore, the line of sight (indicated by an arrow) of the driver 50 is directed to the operation point P on the operation screen 11a. In the present invention, the face position is detected using this behavior.

Figure 4:
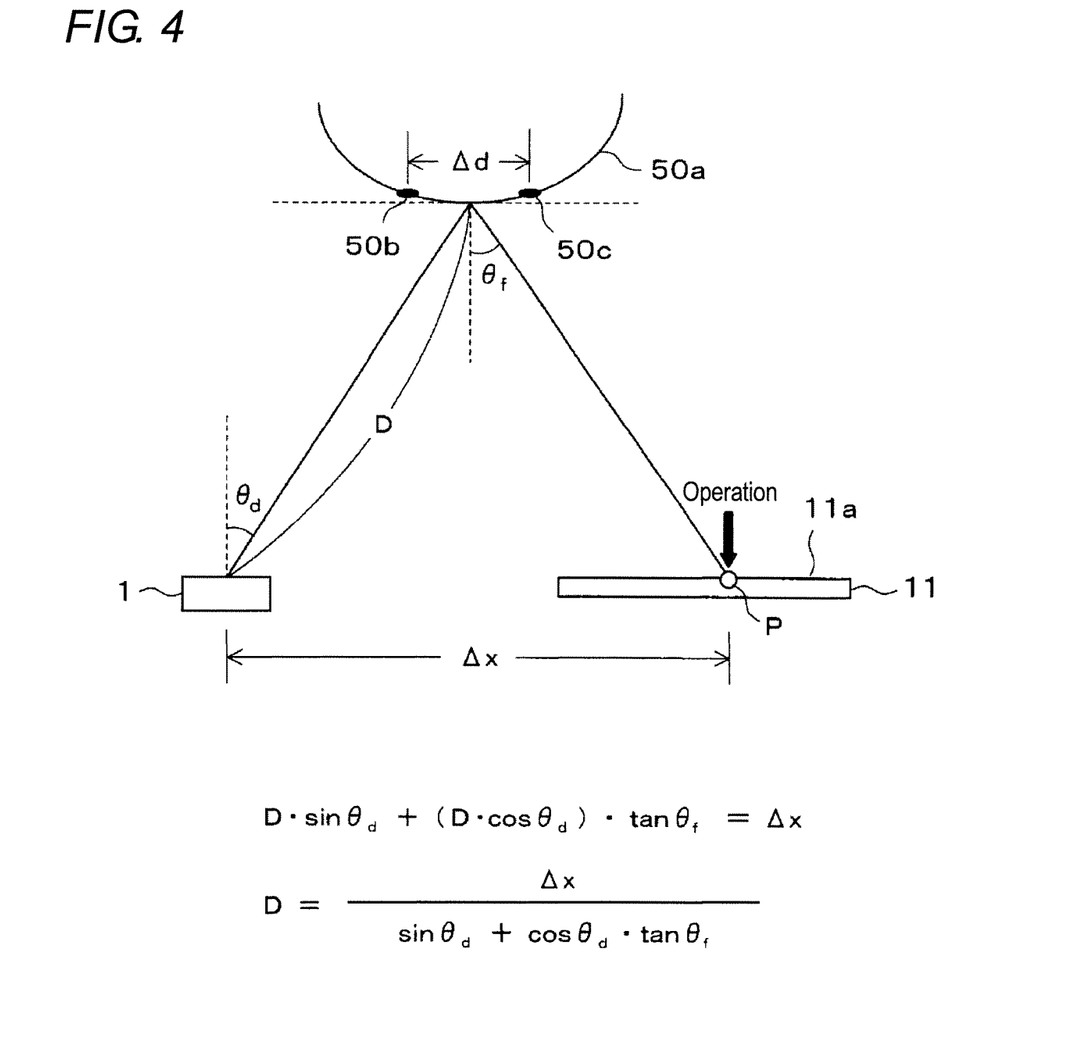
FIG. 4 is a view for explaining a principle of face position detection according to the present invention.

As FIG. 4 illustrates, in a case where an operation is performed on the operation point P in the operation screen 11a of the touch panel 11, the distance Δx from the camera 1 to the operation point P is determined from the detection result of the operation point detector 12. In addition, from the image of the face 50a imaged by the camera 1, two parameters are acquired, that is, the angle of the face 50a with respect to the camera 1 (hereinafter referred to as a "face angle") $\theta_d$ and the angle of the line of sight of the driver 50 watching the operation screen 11a (hereinafter referred to as a "line-of-sight angle") $\theta_f$. Further, from the image of the face 50a, the positional relationship between eyes 50b, 50c, which are characteristic points, that is, a space Δd between the eyes is acquired.

In FIG. 4, the following geometric relationship is established among the distance D representing the position of the face 50a in the space and the parameters Δx, $\theta_d$, $\theta_f$.

$$D \cdot \sin \theta_d + (D \cdot \cos \theta_d) \cdot \tan \theta_f = \Delta x$$

Therefore, the distance D can be calculated from the following arithmetic expression.

$$D = \Delta x / (\sin \theta_d + \cos \theta_d \cdot \tan \theta_f) \tag{1}$$

Note that in FIG. 4, the distance D is the distance from the center of the front surface of the camera 1 to the midpoint between the eyes 50b, 50c on the face 50a. The face angle θd is the angle between the optical axis of the camera 1 and a straight line representing the distance D. The line-of-sight angle θf is the angle between the straight line connecting the operation point P and a predetermined part (here, the midpoint between the eyes 50b, 50c) of the face and a perpendicular line parallel to the optical axis of the camera 1 and passing through the predetermined portion.

Every time an operation is performed on the operation screen 11a, the face position calculator 13 calculates the distance D from the above arithmetic expression (1) using the parameters Δx, $\theta_d$, $\theta_f$ obtained when the operation is performed, and thus calculates the face position in the space. Then, the face position calculator 13 gives the calculated distance D and the space Δd between the eyes acquired from the face image to the approximate expression generating unit 14. The approximate expression generating unit 14 stores the distance D received from the face position calculator 13 and the space Δd between the eyes in association with each other every time the operation screen 11a is operated. As a result, the approximate expression generating unit 14 collects discrete statistical data obtained by associating D and Δd with each other as illustrated in FIG. 5. According to this statistical data, the approximate expression generating unit 14 generates the approximate expression Fn for calculating the distance D (the face position in the space) from the space Δd between the eyes. As an approximation method in this case, a known method such as an interpolation method or a least squares method can be used. Note that the approximate expression Fn is rewritten and updated every time the approximate expression Fn is newly calculated.

As described above, the face position calculator 13 calculates the distance D, which is the face position in the space, by using the above approximate expression Fn when the operation screen 11a is not operated. Since the camera 1 continuously images the face 50a even while the operation screen 11a is not operated, it is possible to acquire the space Δd between the eyes from the image analyzer 3 in real time. Therefore, by applying the acquired Δd to the approximate expression Fn, it is possible to calculate the face position obtained when the operation screen 11a is not operated.

Information on the face position (distance D) calculated in this manner by the face position calculator 13 is transmitted via the CAN communicator 20 together with information such as the line-of-sight direction (the line-of-sight angle $\theta_f$) extracted by the image analyzer 3 to the predetermined ECU. The predetermined ECU determines the section (for example, a meter provided on the dashboard 52) that the driver 50 currently visually recognizes, according to information such as the face position and the line-of-sight direction.

As described above, in the embodiment, when the touch panel 11 is operated, the space Δd between the eyes is extracted from the face image, and the distance D from the camera 1 to the face 50a, that is, the position of the face 50a in the space is geometrically calculated according to the distance Δx determined by the operation point P, the face angle $\theta_d$ and the line-of-sight angle θf obtained from the face image (the above arithmetic expression (1)). In addition, the statistical data obtained by associating the space Δd between the eyes and the distance D at this time with each other is collected, and the approximate expression Fn is generated from the collected statistical data. When the touch panel 11 is not operated, the distance D is calculated according to the space Δd between the eyes extracted from the face image and the approximate expression Fn. Therefore, it is possible to detect the position of the face 50a in the space with a simple configuration without providing a plurality of cameras or providing a dedicated sensor. In particular, since the camera of the driver monitor 10 mounted on the vehicle is used as the camera 1 and the touch panel of the car navigation device also mounted on the vehicle is used as the touch panel 11, modification of software is enough without adding a redundant component.

Figure 6:
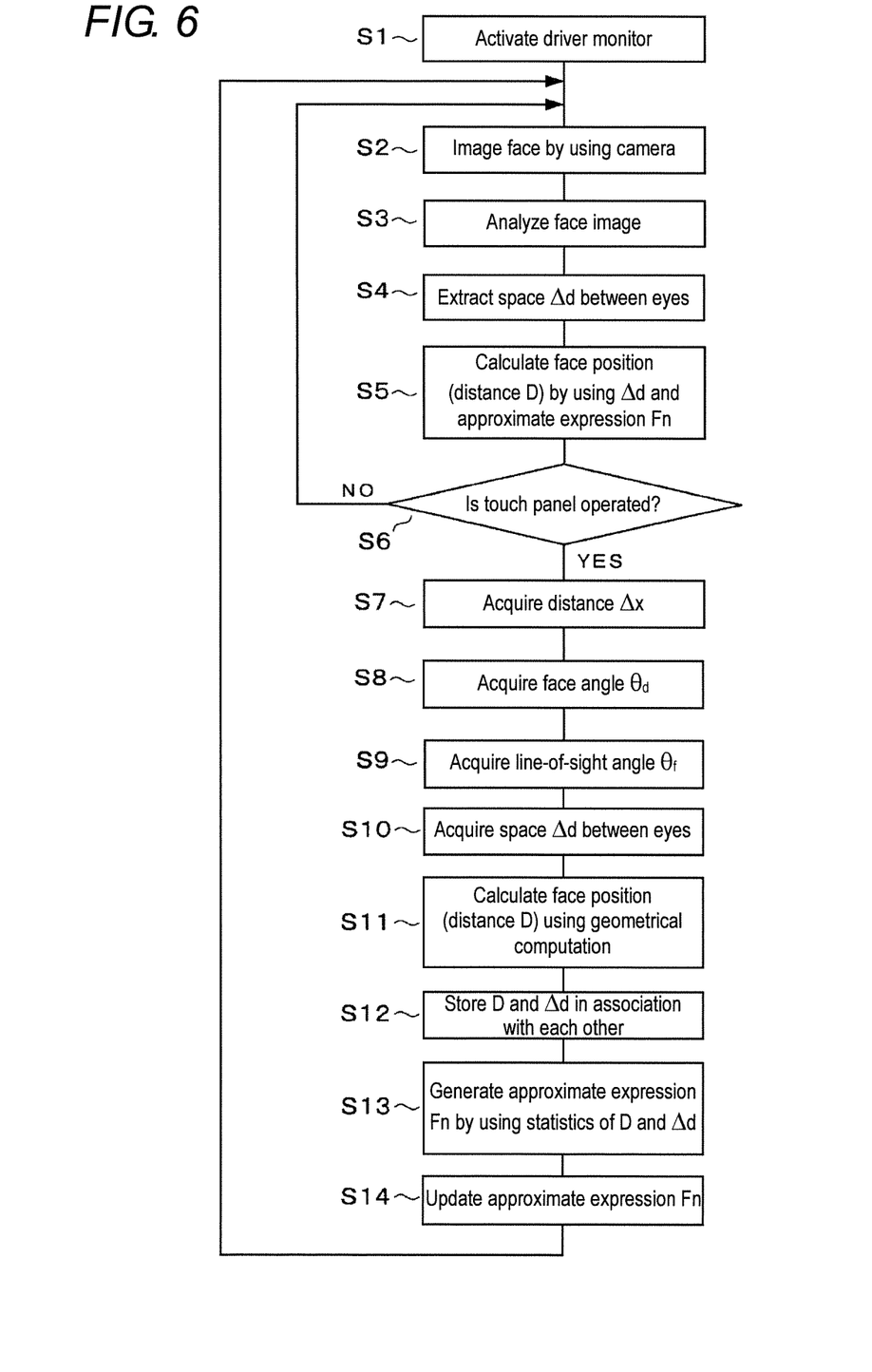
FIG. 6 is a flowchart illustrating operation of the face position detecting device.

FIG. 6 is a flowchart illustrating operation of the face position detecting device 100. The driver monitor 10 executes steps S1 to S4, the face position calculator 13 executes steps S5 to S11, and the approximate expression generating unit 14 executes steps S12 to S14.

In step S1, the driver monitor 10 is activated according to an operation of an ignition switch (not illustrated) or the like. In step S2, the camera 1 starts imaging the face 50a of the driver 50. This imaging continues while the driver monitor 10 is operating. In step S3, the image analyzer 3 analyzes the face image captured by the camera 1. In step S4, the space Δd (FIG. 4) between the eyes 50b, 50c, which are characteristic points, is extracted from the face image. Note that, the driver condition detector 4 detects the condition of the driver according to the analysis result in step S3; however, since this is not directly related to the present invention, this step is omitted in FIG. 6.

In step S5, the distance D (FIG. 4), which is the position of the face 50a in the space, is calculated using the space Δd between the eyes extracted in step S4 and the approximate expression Fn that the approximate expression generating unit 14 has already been calculated. In step S6, whether or not the operation screen 11a of the touch panel 11 is operated is determined according to the presence or absence of a detection signal from the operation point detector 12. In a case where the operation screen 11a is not operated (step S6; NO), the process returns to step S2 and the above-described operation is repeated. In a case where the operation screen 11a is operated (step S6; YES), the process proceeds to step S7.

In step S7, the distance Δx (FIG. 4) from the camera 1 to the operation point P is acquired according to the position of the operation point P that the operation point detector 12 detects. In step S8, the face angle $\theta_d$ (FIG. 4) extracted from the face image is acquired. In step S9, the line-of-sight angle $\theta_f$ (FIG. 4) extracted from the face image is acquired. In step S10, the space θd (FIG. 4) between the eyes 50b, 50c extracted from the face image is acquired. In step S11, the distance D is computed from the above arithmetic expression (1) by using Δx, $\theta_d$, $\theta_f$ acquired in steps S7 to S9, and the position of the face 50a in the space is geometrically calculated.

In step S12, the distance D calculated in step S11 and the space Δd between the eyes acquired in step S10 are stored in association with each other. In step S13, the approximate expression Fn for calculating the distance D is generated using statistical data of D and Δd stored in step S12. In step S14, the approximate expression Fn generated last time is updated to the approximate expression Fn generated this time in step S13. Thereafter, the process returns to step S2, and the series of processes described above is repeated. Therefore, updating of the approximate expression Fn in step S14 is performed every time the operation screen 11a of the touch panel 11 is operated.

Figure 7:
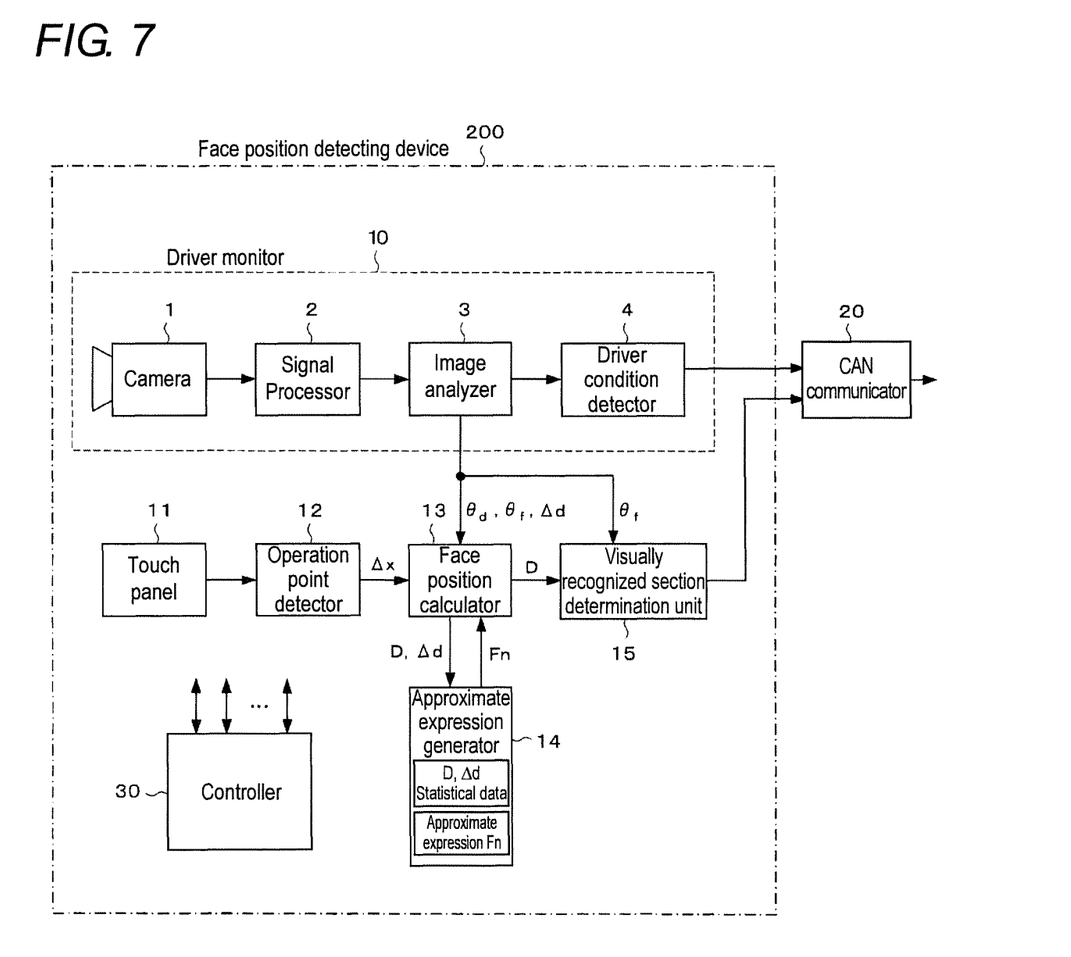
FIG. 7 is a block diagram of a face position detecting device according to another embodiment.

FIG. 7 illustrates a face position detecting device 200 according to another embodiment of the present invention. In FIG. 7, parts identical to those in FIG. 1 are denoted by identical reference signs.

In the face position detecting device 200 of FIG. 7, a visually recognized section determination unit 15 is added to the configuration of the face position detecting device 100 of FIG. 1. In the case of FIG. 1, the ECU side determines the section that the driver 50 visually recognizes. In the case of FIG. 7, the face position detecting device 200 side determines the section that the driver 50 visually recognizes.

In FIG. 7, the visually recognized section determination unit 15 is provided between a face position calculator 13 and a CAN communicator 20, acquires a distance D representing the face position in a space from the face position calculator 13. In addition, the visually recognized section determination unit 15 acquires a line-of-sight angle $\theta_f$ representing a line-of-sight direction from an image analyzer 3. If the distance D and the line-of-sight angle θf are determined, the section that the driver 50 visually recognizes can be determined. Therefore, the visually recognized section determination unit 15 determines the visually recognized section according to D and $\theta_f$. The determination result is sent to a predetermined ECU via a CAN communicator 20. Since other points are identical to those of the face position detecting device 100 of FIG. 1, the description of the portions overlapping with those in FIG. 1 will be omitted.

Figure 8:
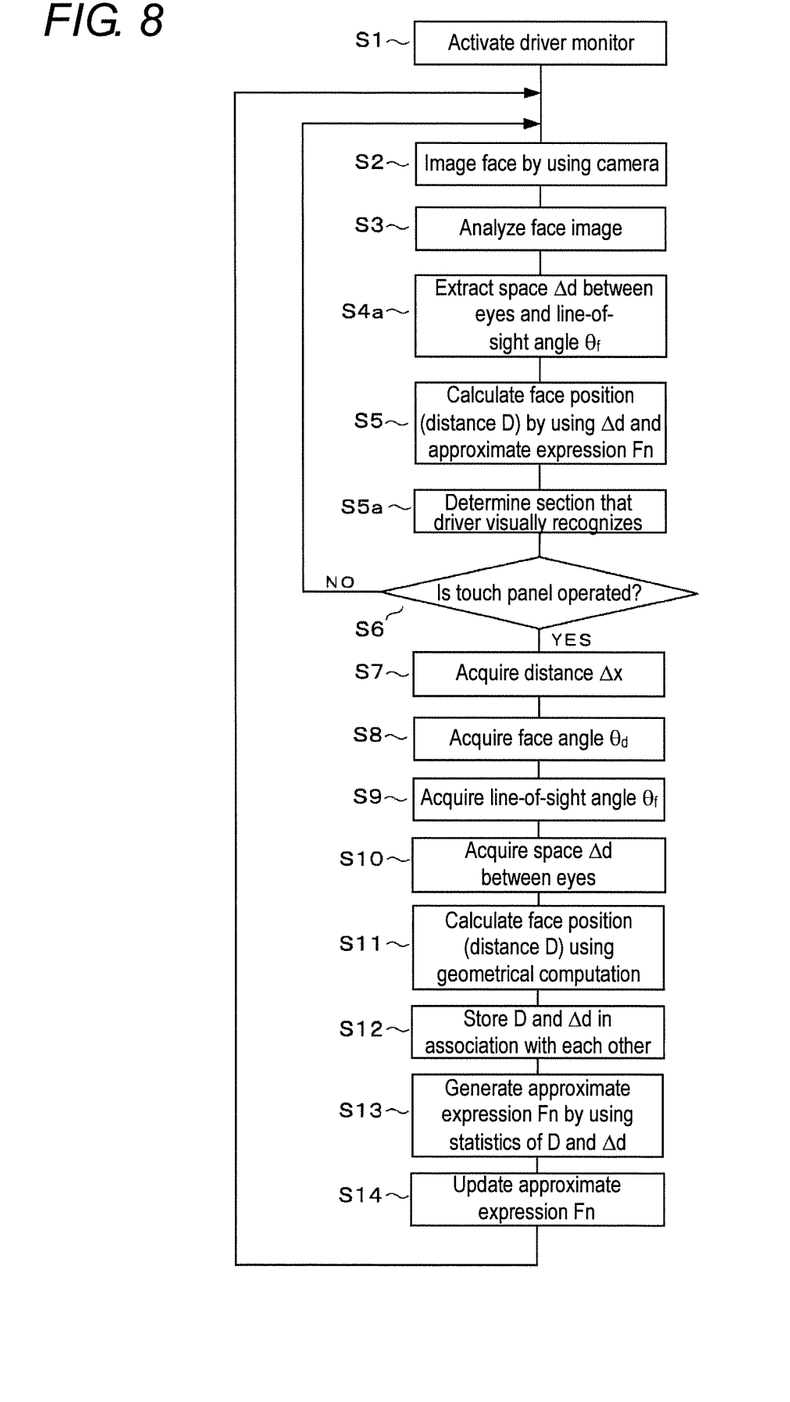
FIG. 8 is a flowchart illustrating operation according to the another embodiment.

FIG. 8 is a flowchart illustrating operation of the face position detecting device 200 of FIG. 7. In FIG. 8, steps identical to those in FIG. 6 are denoted by identical reference signs. The point of difference between the flowchart of FIG. 8 and that of FIG. 6 is that step S4 in FIG. 6 is replaced by step S4a and step S5a is added after step S5 in FIG. 8. In step S4a, a line-of-sight angle $\theta_f$ is extracted in addition to a space Δd between eyes from a face image. In step S5a, according to the line-of-sight angle $\theta_f$ extracted in step S4a and a face position (distance D) calculated in step S5, the section that a driver 50 visually recognizes is determined.

Since other steps are identical to those in FIG. 6, the description of the steps overlapping with those in FIG. 6 will be omitted.

In the present invention, in addition to the embodiments described above, various embodiments to be described below can be adopted.

In the above embodiments, an example is described in which the approximate expression Fn is generated from the statistical data obtained by associating the space Δd between the eyes (the positional relationship of the characteristic points) and the distance D to the face (the face position in the space) when the operation screen 11a is operated and the face position is calculated using this approximate expression Fn when the operation screen 11a is not operated. However, the present invention is not limited to this. For example, a table may be provided that is obtained by associating spaces Δd between eyes and the distance D to a face obtained when operations are performed on an operation screen 11a. When the operation screen 11a is not operated, the distance D corresponding to the space Δd between the eyes obtained from a face image may be extracted by referring to this table to calculate the face position.

In the above embodiments, the space Δd between the eyes 50b, 50c is used as an example of the positional relationship of the characteristic points of the face. However, the present invention is not limited to this example. For example, the distance between ears, the distance between eyebrows, the distance between an eye and an ear, the distance between a nose and an ear, or the like may be used as the positional relationship of characteristic points. In addition, at least two characteristic points are sufficient; however, three or more characteristic points may be used. Further, the positional relationship between the characteristic points is not limited to the space (distance), and may be an angle.

In the above embodiments, the distance D from the camera 1 to the predetermined part of the face 50a is used as the parameter representing the face position in the space. However, the present invention is not limited to this, and a distance D from a section other than the camera 1 to a predetermined part of the face 50a may represent the face position in the space. In addition, the face position in the space is not limited to the distance D, and may be represented by coordinate values.

In the above embodiments, an example is described in which the distance D is calculated from the arithmetic expression (1) every time the touch panel 11 is operated. However, the present invention is not limited to this example. For example, a distance D may be calculated for every two operations or three operations. In this case, when an operation is performed but the distance D is not calculated, the distance D is calculated from the approximate expression Fn.

In the above embodiments, the touch panel 11 is used as an example of the operation unit. However, the operation unit may be, for example, a board in which a plurality of pressing-type switch buttons is arranged side by side.

In the above embodiments, an example is described in which the controller 30 is provided separately from the image analyzer 3, the driver condition detector 4, the face position calculator 13, and the approximate expression generating unit 14. However, the image analyzer 3, the driver condition detector 4, the face position calculator 13, and the approximate expression generating unit 14 may be incorporated into the controller 30.

In the above embodiments, the face position detecting device for detecting the face of the driver of a vehicle is described as an example. However, the present invention can also be applied to a face position detecting device for another use.

The invention claimed is:

1. A face position detecting device comprising:
an imaging unit configured to image a face of a user;
an operation unit including an operation screen and configured to receive a predetermined input by the user operating the operation screen;
an image analyzer configured to analyze an image of the face imaged by the imaging unit and to extract a positional relationship between at least two characteristic points in the face; and
a face position calculator being configured to calculate a position of the face imaged by the imaging unit,
the face position calculator being configured to calculate a position of the face in a space according to positional relationships among the face imaged, the imaging unit, and the operation unit, upon operation of the operation screen, and
the face position calculator being configured to calculate a position of the face in the space according to the positional relationship between the at least two characteristic points that the image analyzer extracts from the face imaged and positional relationships between a plurality of positions of the face and a plurality of the at least two characteristic points corresponding to the plurality of positions of the face obtained in respective operations, respectively, except upon the operation.

2. The face position detecting device according to claim 1, wherein upon operation of the operation screen, the face position calculator geometrically calculates a position of the face in the space according to an angle of the face with respect to the imaging unit, a line-of-sight angle of the user watching the operation screen, and a distance from the imaging unit to an operation point on the operation screen.

3. The face position detecting device according to claim 1, further comprising an approximate expression generating unit configured to generate an approximate expression for calculating a position of the face from the positional relationship of the at least two characteristic points,
the approximate expression generating unit being configured to collect statistical data obtained by associating a positional relationship of the at least two characteristic points extracted by the image analyzer upon each operation of the operation screen with a position of the face calculated by the face position calculator upon each operation of the operation screen and configured to generate the approximate expression according to the statistical data.

4. The face position detecting device according to claim 3, wherein the approximate expression generating unit updates the approximate expression every time the operation screen is operated.

5. The face position detecting device according to claim 1, further comprising a visually recognized section determination unit configured to determine a section that the user visually recognizes according to a position of the face in the space that the face position calculator calculates and a line-of-sight direction of the user that the image analyzer extracts.

6. The face position detecting device according to claim 1, wherein the position of the face in the space is a distance from the imaging unit to a predetermined part of the face.

7. The face position detecting device according to claim 1, wherein the operation unit is configured as a touch panel.

8. The face position detecting device according to claim 7, wherein the touch panel is a touch panel of a car navigation device mounted in a vehicle.

9. The face position detecting device according to claim 1, wherein the imaging unit is a camera of a driver monitor mounted on a vehicle and configured to monitor a condition of a driver.

* * * * *